(12) United States Patent
Timon

(10) Patent No.: US 11,912,170 B2
(45) Date of Patent: Feb. 27, 2024

(54) ANGULAR ADJUSTMENT DEVICE FOR A VEHICLE SEAT

(71) Applicant: FAURECIA Sièges d'Automobile, Nanterre (FR)

(72) Inventor: Michel Timon, Le Vey (FR)

(73) Assignee: FAURECIA Sièges d'Automobile, Nanterre (FR)

(*) Notice: Subject to any disclaimer, the term of this patent is extended or adjusted under 35 U.S.C. 154(b) by 0 days.

(21) Appl. No.: 17/850,367

(22) Filed: Jun. 27, 2022

(65) Prior Publication Data

US 2022/0410767 A1 Dec. 29, 2022

(30) Foreign Application Priority Data

Jun. 28, 2021 (FR) .................................. 2106924

(51) Int. Cl.
| | |
|---|---|
| *B60N 2/20* | (2006.01) |
| *B60N 2/22* | (2006.01) |
| *B60N 2/225* | (2006.01) |
| *B60N 2/235* | (2006.01) |
| *F16H 25/06* | (2006.01) |

(52) U.S. Cl.
CPC .............. *B60N 2/20* (2013.01); *B60N 2/2227* (2013.01); *B60N 2/2257* (2013.01); *B60N 2/2356* (2013.01); *F16H 25/06* (2013.01)

(58) Field of Classification Search
CPC ..... F16H 25/06; B60N 2/2257; B60N 2/2227; B60N 2/2356; B60N 2/20
See application file for complete search history.

(56) References Cited

U.S. PATENT DOCUMENTS

| | | | | |
|---|---|---|---|---|
| 1,735,616 | A * | 11/1929 | Morison | F16H 25/06 475/168 |
| 3,517,965 | A * | 6/1970 | Cowles | B60N 2/2227 297/378.12 |
| 3,523,593 | A * | 8/1970 | Karasick | F16D 41/064 188/82.5 |
| 5,643,128 | A * | 7/1997 | Kennedy | F16H 25/06 475/168 |
| 5,896,973 | A * | 4/1999 | Hochmuth | F16D 41/088 192/223.2 |

(Continued)

FOREIGN PATENT DOCUMENTS

| | | | |
|---|---|---|---|
| DE | 19930351 A1 * | 1/2001 | ........... B60N 2/2227 |
| DE | 10129271 A1 | 1/2003 | |

(Continued)

*Primary Examiner* — Syed A Islam
(74) *Attorney, Agent, or Firm* — Barnes & Thornburg LLP

(57) ABSTRACT

A hinge comprising a first and a second plate intended to be connected respectively to a first and to a second vehicle seat element, the first plate comprising a base toothed portion with N teeth, a plurality of sets of rolling elements, each radially movable between at least one locking position, in which the rolling element is at least partially engaged in a space between two teeth, and an unlocking position in which the rolling element is disengaged from the space, a plurality of movable cams, each cooperating with the rolling elements of a different set, so as to cause the rolling elements to transition from their unlocking position to a locking position, and vice versa, and a control hub, able to move the cams.

10 Claims, 8 Drawing Sheets

(56) References Cited

U.S. PATENT DOCUMENTS

| | | | | |
|---|---|---|---|---|
| 6,032,777 A * | 3/2000 | Denis | ................... | B60N 2/2227 |
| | | | | 192/223.2 |
| 6,508,347 B1 * | 1/2003 | Hochmuth | ............. | B60N 2/236 |
| | | | | 192/223.2 |
| 8,720,661 B2 * | 5/2014 | Karthaus | .............. | B60N 2/2257 |
| | | | | 192/223.2 |
| 9,527,410 B2 * | 12/2016 | Leconte | ................ | B60N 2/2252 |
| 9,573,493 B2 * | 2/2017 | Nagura | ................ | B60N 2/2236 |
| 9,656,396 B2 * | 5/2017 | Miyazaki | .................. | F16D 3/64 |
| 9,796,301 B2 * | 10/2017 | Aktas | ....................... | B60N 2/22 |
| 9,897,189 B2 * | 2/2018 | Liang | .................... | F16H 49/001 |
| 10,267,403 B2 * | 4/2019 | Liang | ....................... | F16H 55/00 |

FOREIGN PATENT DOCUMENTS

| | | |
|---|---|---|
| EP | 2995498 A1 | 3/2016 |
| FR | 3072620 B1 | 3/2021 |
| KR | 20040092065 A | 11/2004 |

\* cited by examiner

ANGULAR ADJUSTMENT DEVICE FOR A VEHICLE SEAT

PRIORITY CLAIM

This application claims priority to French Patent Application No. FR2106924, filed Jun. 28, 2021, which is expressly incorporated by reference herein.

BACKGROUND

The present disclosure relates to X, and particularly to Y. More particularly, the present disclosure relates to Z.

The present disclosure relates to the field of vehicle seats, and in particular motor vehicle seats.

SUMMARY

According to the present disclosure, a hinge for angular adjustment of a first vehicle seat element relative to a second vehicle seat element around a hinge axis, the hinge comprising:

a first and a second hinge plate intended to be integrally connected respectively to the first and to the second vehicle seat element, the first plate comprising a base toothed portion with N regularly spaced teeth, a plurality of sets of rolling elements, each comprising at least one rolling element, distributed around the hinge axis, each rolling element of each set being radially movable between at least one locking position, in which the rolling element is at least partially engaged in the space between two successive teeth, bearing against the opposite faces of the two successive teeth, and an unlocking position in which the rolling element is disengaged from the space between two successive teeth of the base toothed portion, a plurality of control cams, movable relative to the first hinge plate, and each cooperating with the rolling elements of a different set, such that the movement of each control cam relative to the first hinge plate causes the rolling elements to transition from their unlocking position to their at least one locking position and vice versa, each of the control cams being biased to return by a respective spring, and a control hub able to move the control cams relative to the first hinge plate.

In illustrative embodiments, the base toothed portion extends substantially along a circle centered on the hinge axis, and the rolling elements of the sets of rolling elements are also distributed substantially along a circle centered on the hinge axis, at least in their unlocking position.

In illustrative embodiments, the control cams are arranged to move in translation relative to the first hinge plate substantially along a circle centered on the hinge axis, in order to cause the rolling elements to transition from their unlocking position to their at least one locking position and vice versa.

In illustrative embodiments, each set of rolling elements comprises two rolling elements arranged side by side, a first rolling element being provided to be received in a first space between two successive teeth of the base toothed portion in its at least one locking position, and a second rolling element being provided to be received in a second space between two successive teeth of the base toothed portion in its at least one locking position, the second space advantageously being adjacent to the first space.

In illustrative embodiments, the hinge comprises at least four sets of rolling elements, preferably at least six.

In illustrative embodiments, the rolling elements have a substantially circular cross-section.

In illustrative embodiments, the rolling elements are rollers of substantially cylindrical shape, or balls.

In illustrative embodiments, the hinge further comprises a guide piece, advantageously substantially annular, with a plurality of housings, each housing at least partially receiving the rolling elements of a set of rolling elements, and being configured to ensure: the retention in position of the rolling elements of the set of rolling elements in a direction substantially perpendicular to the radial direction of movement of the rolling elements and to the axial direction of the hinge, and the guiding of the rolling elements during their radial movement between their unlocking position and their at least one unlocking position and vice versa.

In illustrative embodiments, at least one set of rolling elements further comprises a force transmission element interposed, in the radial direction of movement of the rolling elements, between the rolling elements of the set of rolling elements and the control cam with which they cooperate In illustrative embodiments, the force transmission element is a roller of substantially cylindrical shape, or a ball.

In illustrative embodiments, the force transmission element bears against each of the rolling elements of the set of rolling elements and against the control cam with which the rolling elements cooperate.

In illustrative embodiments, the force transmission element is received in one of the housings of the guide piece, the housing also being configured to ensure: the retention in position of the force transmission element in the direction substantially perpendicular to the radial direction of movement of the rolling elements and to the axial direction of the hinge, and the guiding of the force transmission element during its radial movement.

In illustrative embodiments, the sets of rolling elements are arranged in a same plane at the same axial position of the hinge.

The present disclosure also relates to a vehicle seat comprising a seating portion, a backrest, and at least one hinge according to any one of the embodiments of the present disclosure between the seating portion and the backrest.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
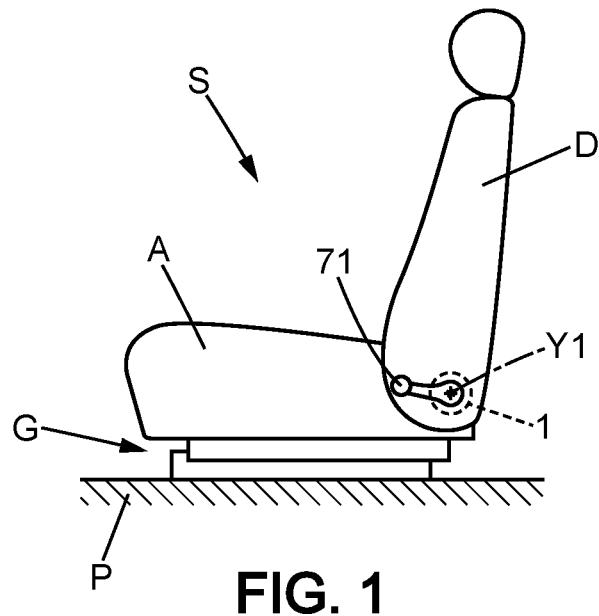
FIG. 1 shows a schematic side view of a seat according to one embodiment of the present disclosure.

The present disclosure relates, as can be seen in FIGS. 1 to 6C, to a hinge 1 for angular adjustment of a first vehicle seat element D, in particular of a motor vehicle seat, relative to a second vehicle seat element A, in particular of a motor vehicle seat, around a hinge axis Y1, the hinge 1 comprising:
- a first and a second hinge plate 2, 3 intended to be integrally connected respectively to the first and to the second vehicle seat element D, A, the first plate 2 comprising a base toothed portion 21 with N teeth 22 regularly spaced apart,
- a plurality of sets 4 of rolling elements, each comprising at least one rolling element 41, distributed around the hinge axis Y1, each rolling element 41 of each set 4 being radially movable between at least one locking position, in which the rolling element 41 is at least partially engaged in the space 23 between two successive teeth 22, bearing against the opposite faces of the two successive teeth 22, and an unlocking position in which the rolling element 41 is disengaged from the space 23 between two successive teeth 22 of the base toothed portion 21,
- a plurality of control cams 5, movable relative to the first hinge plate 2 and each cooperating with the rolling elements 41 of a different set 4, such that the movement of each control cam 5 relative to the first hinge plate 2 causes the rolling elements 41 to transition from their unlocking position to their at least one locking position, and vice versa, each of the control cams 5 being returned to position by a respective spring 6, and in particular to its position causing the rolling elements 41 to move into their unlocking position,
- a control hub 7 able to move the control cams 5 relative to the first hinge plate 2.

Such a hinge 1 thus allows precise adjustment and retention of the relative position between the first D and second A vehicle seat element, with a simplified design compared to comparative angular adjustment devices. In particular, it is not necessary to use toothed bushes as in a comparative seat hinge, which can be complex and expensive to manufacture.

As a result, the cost price of the hinge 1 according to the present disclosure is significantly reduced compared to comparative angular adjustment devices.

Also, in the findings of the inventor, the hinge 1 according to the present disclosure allows retention in position of the first seat element D relative to the second seat element A with high mechanical strength, and in particular in the event of impact.

Finally, according to the findings of the inventor, the weight of the hinge 1 according to the present disclosure is not increased compared to the weights of comparative hinges, and may even be reduced.

As can be seen in FIG. 1, the hinge 1 can be mounted on a vehicle seat S. Such a seat S generally comprises a backrest D mounted on a seating portion A so as to pivot about a transverse pivot axis Y1, advantageously corresponding to the hinge axis Y1 of the hinge 1. The seating portion A is intended to be fixed to the floor P of a vehicle, in particular by means of longitudinal slides G.

Advantageously, there may be provided a control handle 71 coupled to the control hub 7 of the hinge 1, which allows a user seated on the seat S to adjust the angular position of the backrest D relative to the seating portion A.

Figure 2:
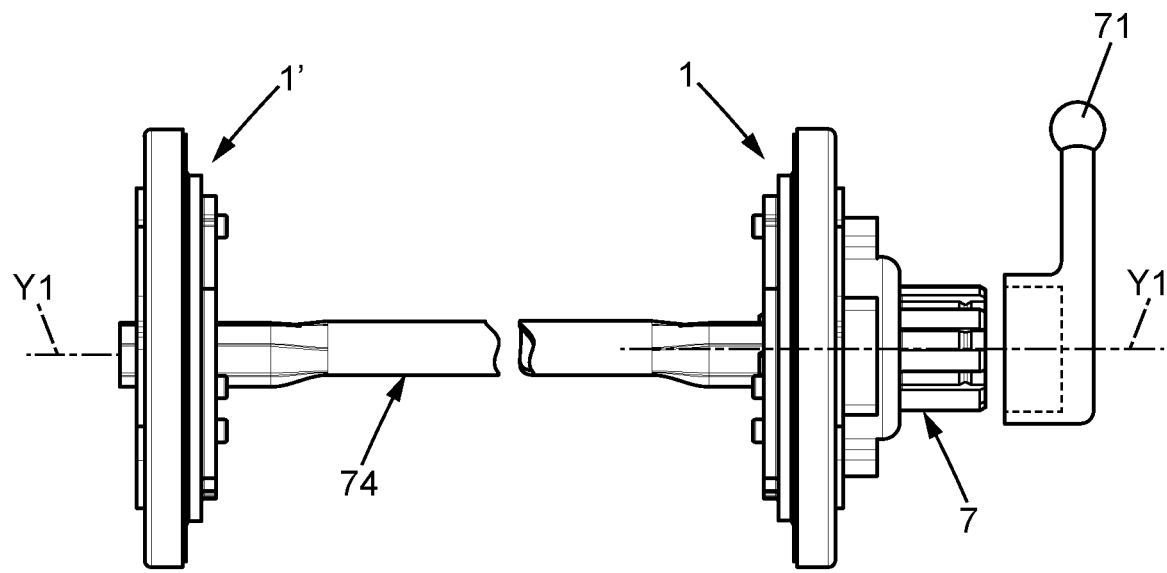
FIG. 2 shows a front view of an angular adjustment device comprising two hinges according to one embodiment of the present disclosure.

As can be seen in FIG. 2, the hinge 1 may advantageously be part of an angular adjustment device 10 comprising a first hinge 1 according to the present disclosure, for example on the left side of the seat S, and possibly a second hinge 1', advantageously identical to the hinge 1 according to the present disclosure, for example on the right side of the seat S. It may be possible to actuate the first 1 and the second 1' hinge in a synchronized manner by the control handle 71.

The first 1 and/or second 1' hinge are thus capable of blocking the pivoting of the backrest D relative to the seating portion 1 in a situation of normal usage of the seat S, and are also capable of allowing a rotational movement of the backrest D relative to the seating portion A when a user pulls on the control handle 71.

It should be noted that the first hinge 1, and where appropriate the second hinge 1', can be used to connect any vehicle seat element S to another seat element, and not necessarily the seating portion A and backrest D.

As can be seen in FIG. 2, a connecting bar 74 connecting the first 1 and second 1' hinge may be provided.

Figure 3:
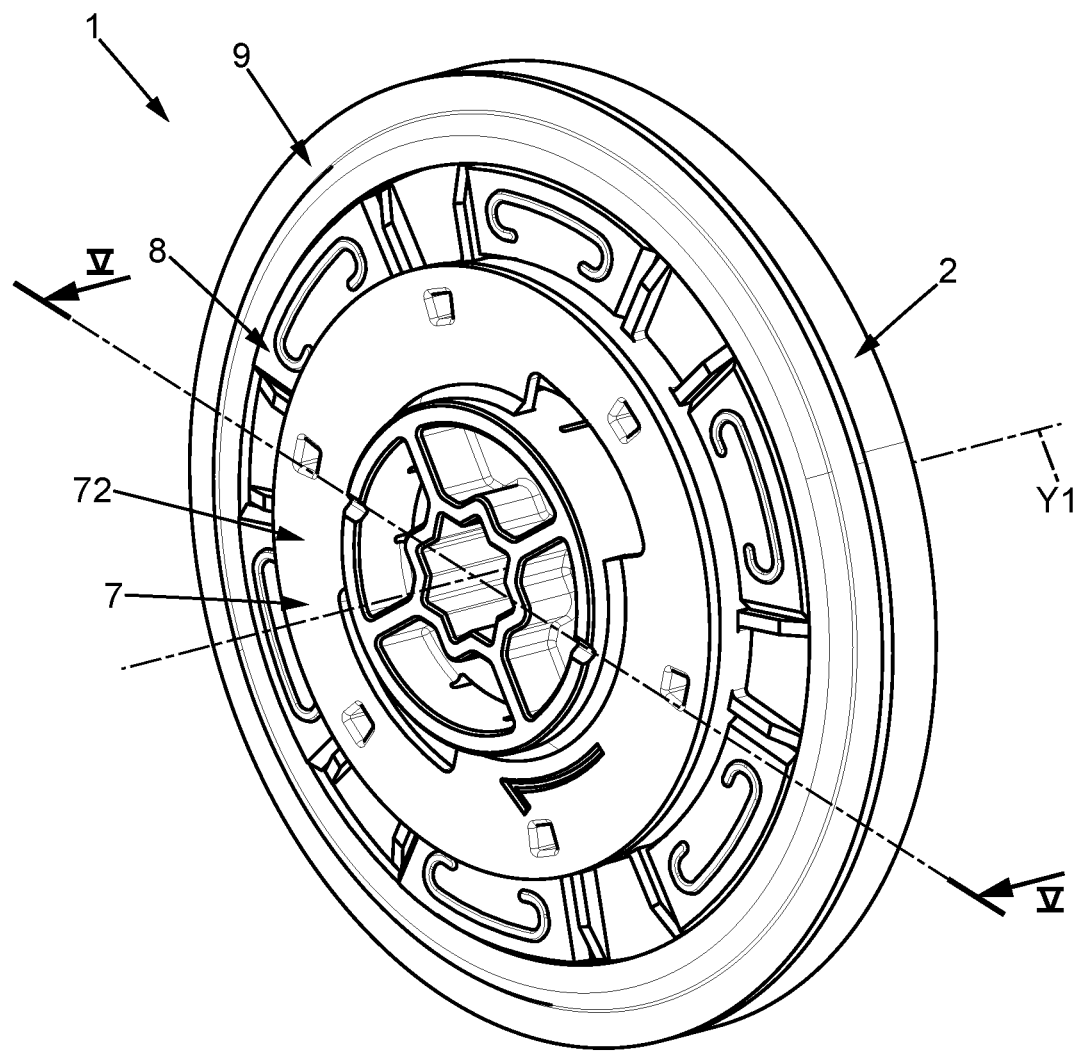
FIG. 3 shows a perspective view of a hinge according to one embodiment of the present disclosure.
Figure 4A:
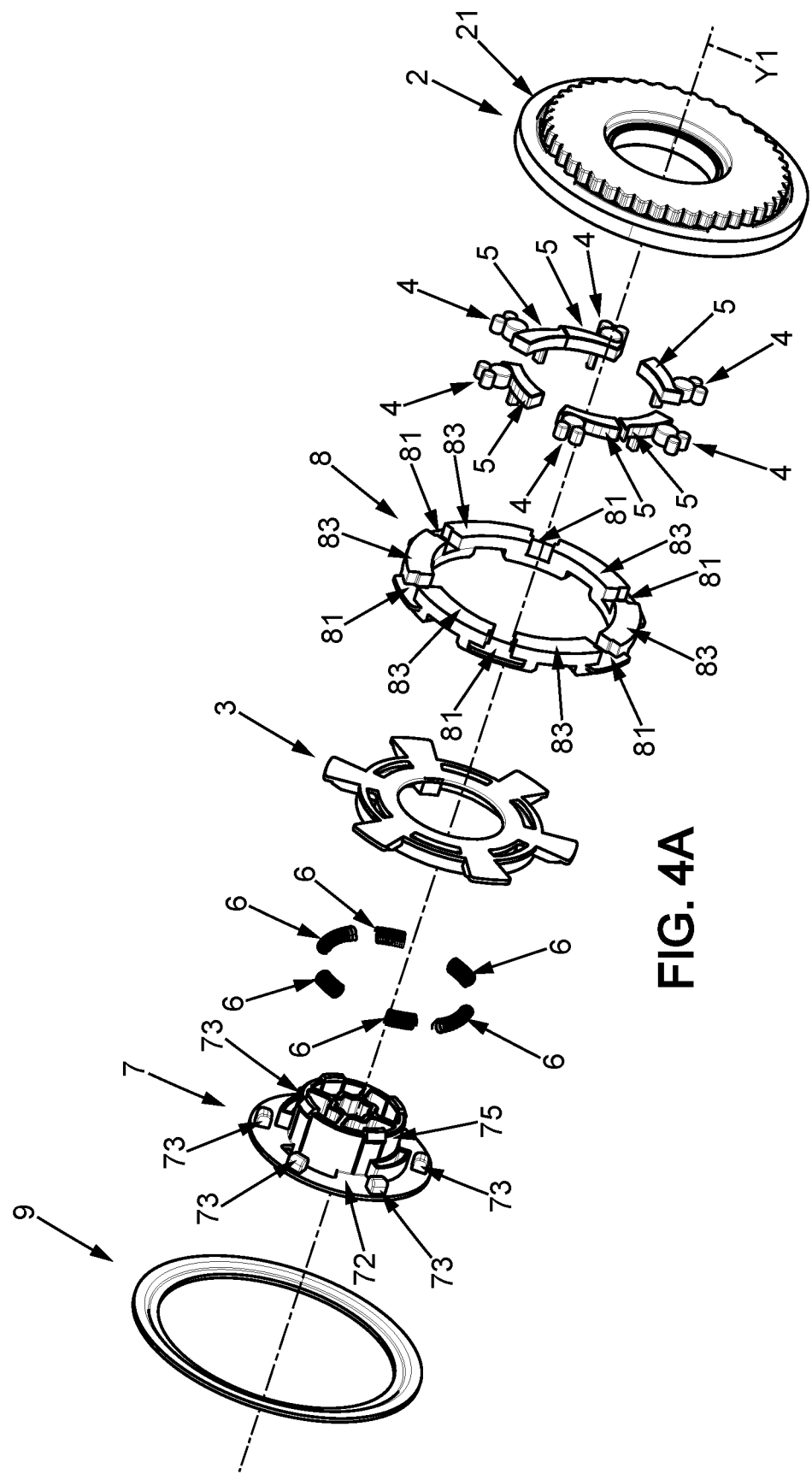
FIG. 4A shows an exploded perspective view according to a first orientation of the hinge of FIG. 3.
Figure 4B:
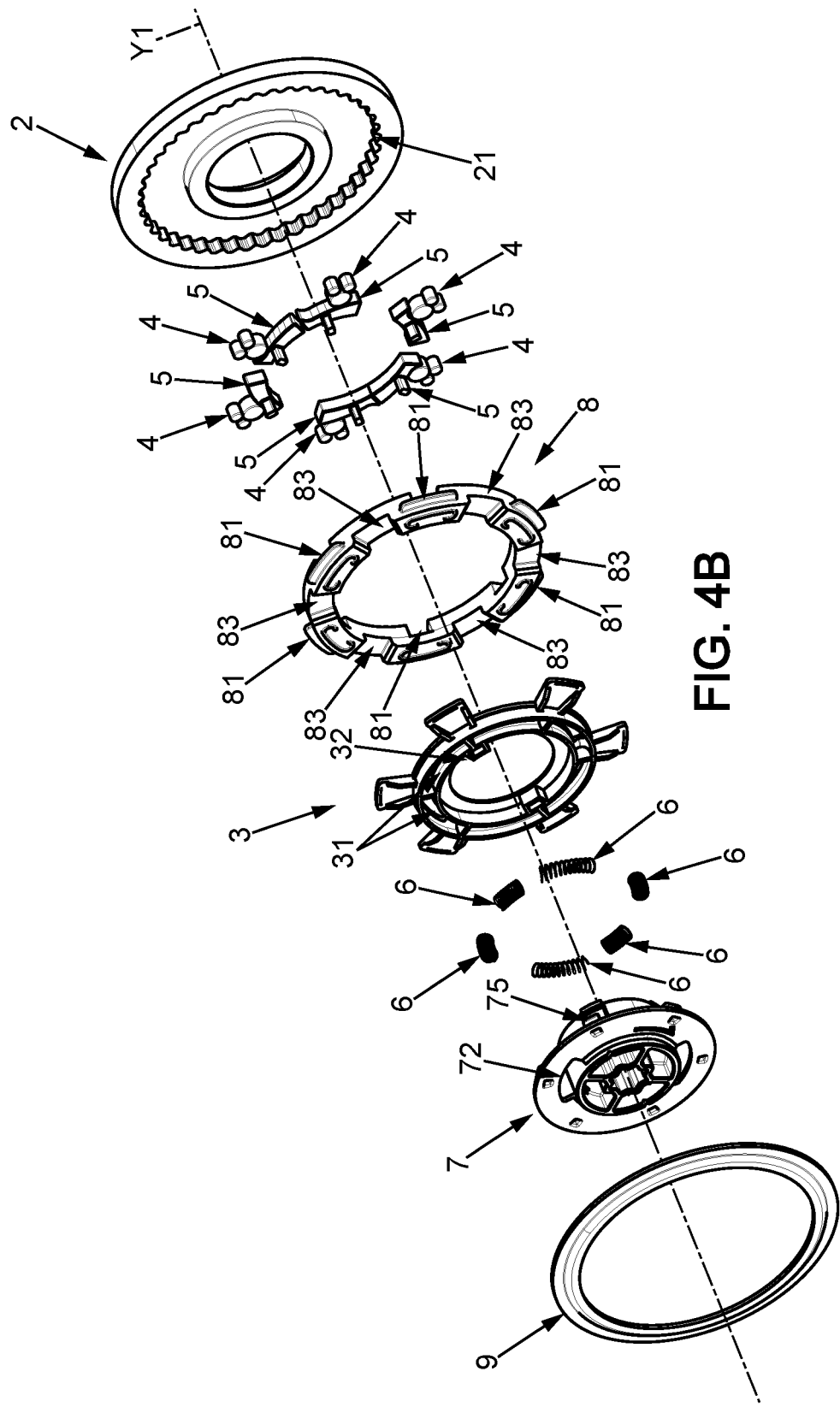
FIG. 4B shows an exploded perspective view according to a second orientation of the hinge of FIG. 3.

As can more clearly be seen in FIGS. 3, 4A, and 4B, the first hinge 1 comprises a first 2 and a second plate 3, in particular of metal, which advantageously may be respectively fixed to the frame of the seating portion A and to the frame of the backrest D (the reverse obviously being possible). These two plates 2, 3 have a substantially cylindrical general shape, and may be interconnected by a crimped metal ring 9, thus defining an interior space which contains a locking system as detailed in the present application.

Purely by convention, the first plate 2 can be called the "moving" plate, and the second plate 3 can be called the "fixed" plate.

The locking system thus comprises several sets 4 of rolling elements 41, as well as the toothed surface 21 of the first plate 2, advantageously located on a peripheral annular area of the first plate 2, the toothed surface 21 being advantageously oriented radially towards the interior of the first plate 2, and in particular in the direction of the hinge axis Y1, and positioned facing the rolling elements 41 of the assemblies 4. The toothed surface 21 may advantageously be substantially circular and is called the "base toothed portion" in the present application.

Figure 6A:
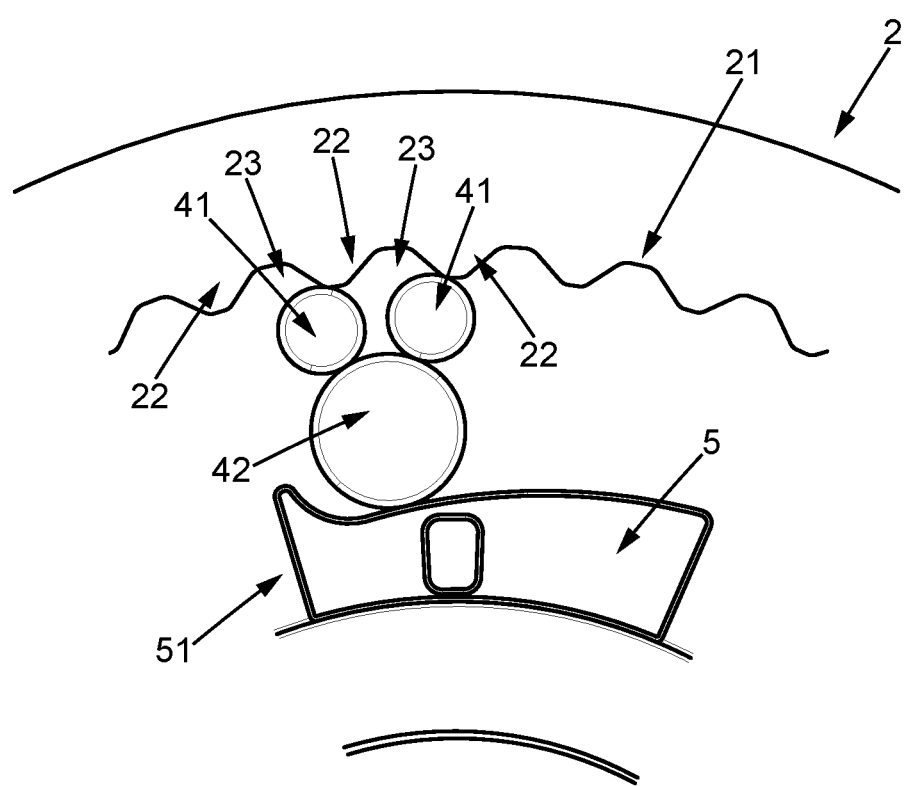
FIG. 6A shows a first detail view of FIG. 5A.
Figure 6B:
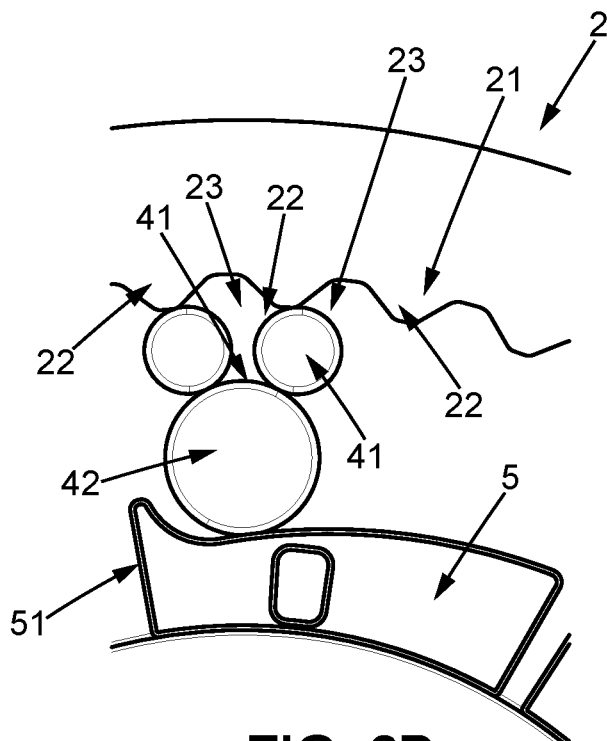
FIG. 6B shows a second detail view of FIG. 5A.
Figure 6C:
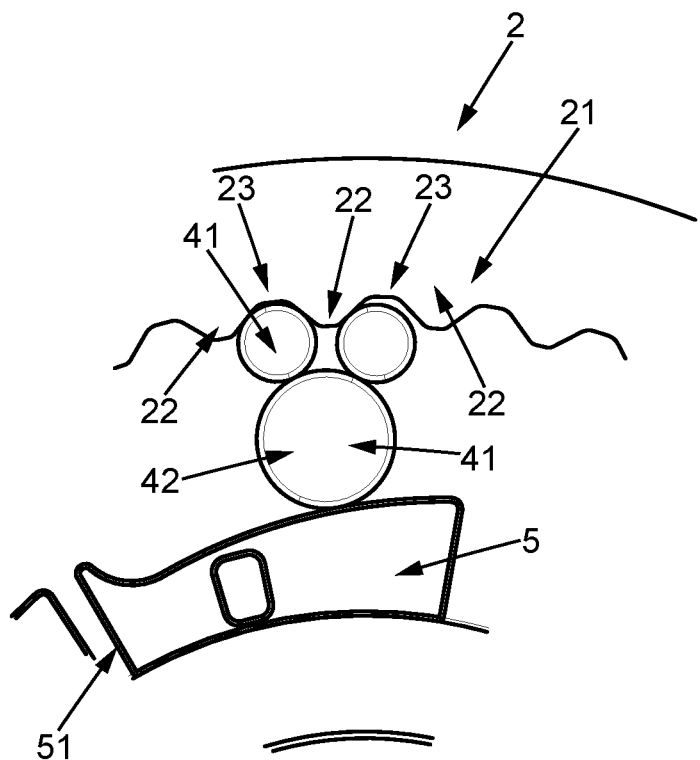
FIG. 6C shows a third detail view of FIG. 5A.

Each rolling element 41 of each set 4 is radially movable between:
- one or more locking positions, as can be seen more particularly in FIG. 6C, where it comes to engage at least partially with the abovementioned base toothed portion 21 by being at least partially within the space 23 between two successive teeth 22, bearing against the opposite faces of the two successive teeth 22, and
- one, or even several, unlocking positions, as can be seen more particularly in FIGS. 6A and 6B, where it is moved radially inwards in the direction of the hinge axis Y1, so as to be disengaged from the space 23 between two successive teeth 22 of the base toothed portion 21 and not bearing against the opposite faces of the two successive teeth 22, which makes it possible to release the rotation of the second plate 3 relative to the first plate 2.

As can be seen in FIGS. 4A and 4B, the control hub 7 may include a control plate 72 (which can also be called a "control mask"), which also cooperates with the control cams 5, in particular by means of a plurality of pins 73 provided to press against the various control cams 5 so as to cause their movement relative to the first plate 2.

Each control cam 5 respectively cooperates with the rolling elements 41 of a set 4, by forming a ramp on its outer peripheral edge to push the corresponding rolling elements 41 in a radially outward engagement.

Each control cam 5 is biased towards a position called the locking position, which by cam effect causes movement of the rolling elements 41 of the set 4 with which it cooperates towards the base toothed portion 21, and advantageously into their locking position as described above, this biasing being ensured by respective springs 6.

Preferably, the springs 6 are arranged in cups 31 of the second plate 3. It can be seen here that the biasing of the control cams 5 is advantageously ensured independently by the springs 6. Each spring 6 may be housed in an individual cup 31.

The control hub 7, for example made of plastic, may in particular comprise a cylindrical bearing surface 75 received in a bearing housing 32 of the second plate 3.

A return spring, not shown in the figures, is provided between the control hub 7, in particular the cylindrical bearing surface 75 thereof, and the second plate 3, so as to return the control cams 5 to a position of locking the rolling elements 41 of the various sets 4.

The control hub 7 may be rotated by actuation of the handle 71, into an unlocking position where the control hub 7, in particular via the control plate 72, causes the rolling elements 41 of the various sets 4 to move radially inwards to the unlocking position (FIGS. 6A and 6B), by the action of the control cams 5.

Once assembly has been completed, the three parts which are the control hub 7, the control handle 71, and the connecting rod 74, form an integral whole which here is called the 'control shaft', immobilized along the axial direction Y due to the imprisonment of the control hub 7 in the hinge 1, but with a degree of angular freedom relative to the control cams 5.

Although such a case is not shown in the figures, it is important to note that a single hinge 1 may be used to implement the present disclosure, with no actual connecting bar 74.

The operation of the hinge is now described with reference to FIGS. 5A to 6C in particular.

At rest, the control shaft is in what is referred to as the rest position, without any action on the control cams 5, due to the presence of angular play ('dead' travel).

The dead travel is typically chosen to be between 3° and 10°. If the second hinge 1' is present, the dead travel of this second hinge may be slightly different, but there is indeed an angular displacement which provides that the two hinges 1, 1' are properly locked when the control shaft is returned to the rest position.

When the user operates the control handle 71, for example clockwise, the control hub 7 pivots on the transverse axis Y1 to a so-called attack position, where its pins 73 come into contact with the control cams 5, and in particular with a side face 51 of the control cams 5. While continuing the rotation of the control hub 7 around the transverse axis Y1, the pins 73 control the movement of the control cams 5 and thus release the engagement of the rolling elements 41 of the various sets 4 from the base toothed portion 21, to completely release the relative rotation of the first and second plates 2, 3, and for example allow adjusting the position of the backrest D relative to the seating portion A of the seat S.

When the user releases the stress on the control hub 7, the springs 6 return the control cams 5 to their locking position and consequently the cams tend to push each of the rolling elements 41 of the various sets 4 to a locking position.

Figure 5A:
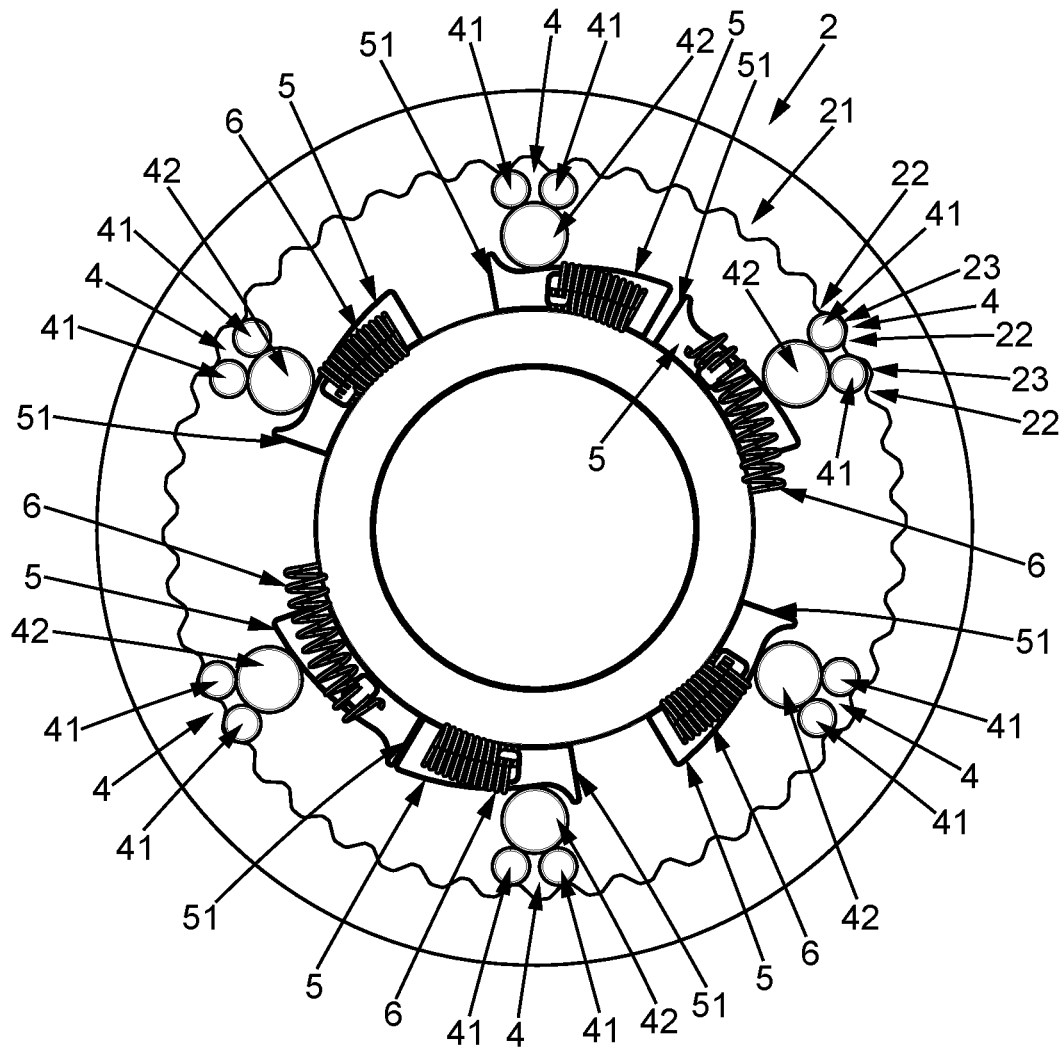
FIG. 5A shows a front view of the hinge of FIG. 3, in which some of the elements have been hidden.
Figure 5B:
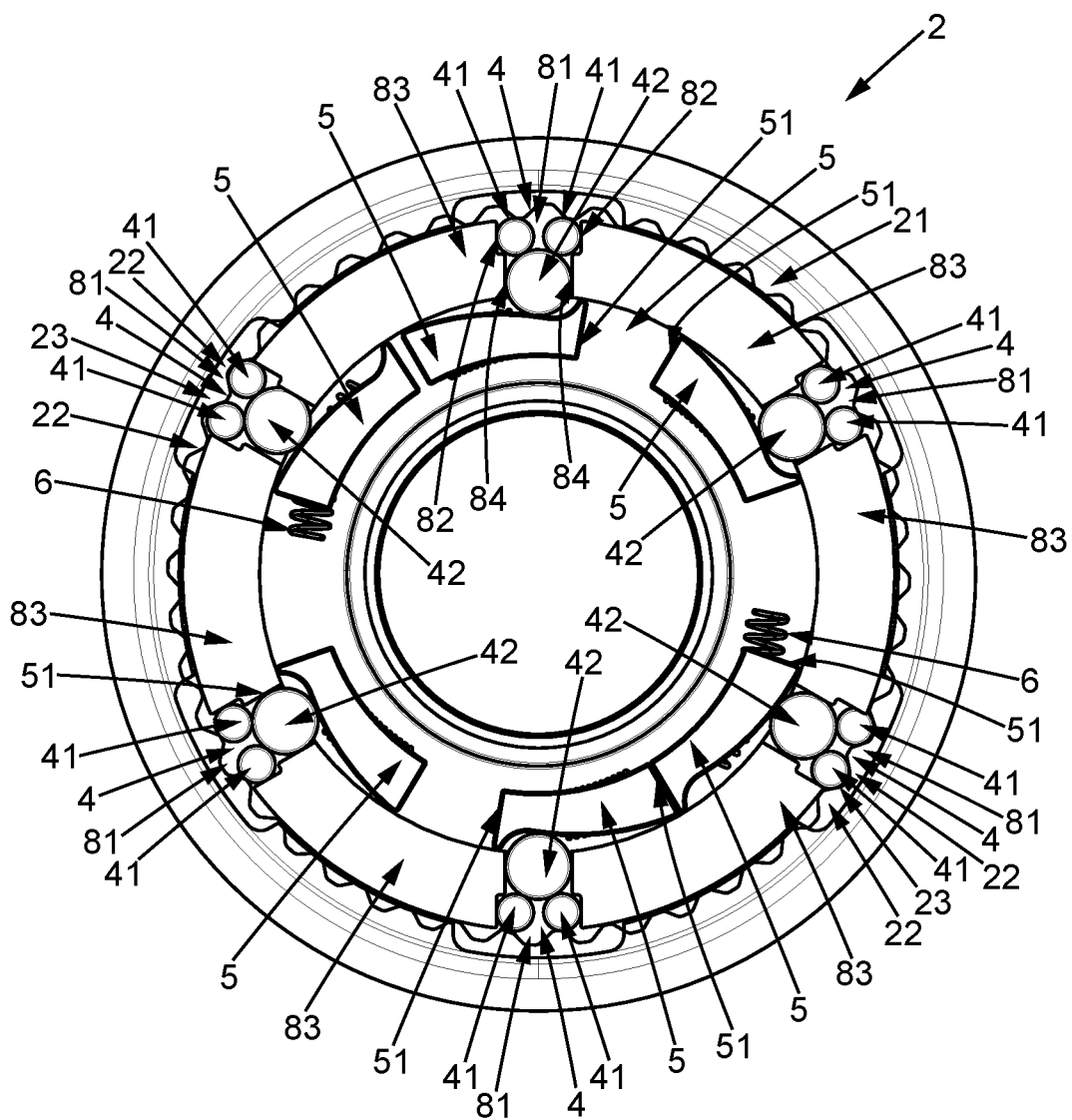
FIG. 5B shows a sectional view along line V-V in FIG. 3 of the hinge of FIG. 3.

Here, in a noteworthy manner and as can be seen more particularly in FIG. 5B, the rolling elements 41 and the base toothed portion 21 may be shaped so that, in any relative position of the first and second plates 2, 3 around the transverse axis Y1, at least one rolling element 41 of a first set 4 is received in a first space 23 between two successive teeth 22 of the base toothed portion 21, bearing against the opposite faces of the two successive teeth 22, while at least one rolling element 41 of a second set 4 is received in a second space 23 between two successive teeth 22 of the base toothed portion 21, bearing against the opposite faces of the two successive teeth 22.

Opposite faces is understood to mean faces oriented in two opposite directions of the relative rotation of the base toothed portion 21 with respect to the sets 4. Thus, each rolling element 41 received in a space 23 between two successive teeth 22 of the base toothed portion 21, bearing against the opposite faces of the two successive teeth 22, prevents the relative rotation of the base toothed portion 21 with respect to the sets 4, in the two directions of rotation about the transverse axis Y1.

According to one embodiment, the base toothed portion 21 extends substantially along a circle centered on the hinge axis Y1, and the rolling elements 41 of the sets of rolling elements 4 are also distributed substantially along a circle centered on the hinge axis Y1, at least in their unlocking position.

According to one embodiment, and as can be seen more particularly in FIGS. 4A, 4B, and 5, each set 4 of rolling elements comprises two rolling elements 41 arranged side by side, a first rolling element 41 being provided to be received in a first space 23 between two successive teeth 22 of the base toothed portion 21 in its at least one locking position, and a second rolling element 41 being provided to be received in a second space 23 between two successive teeth 22 of the base toothed portion 21 in its at least one locking position, the second space 23 being advantageously adjacent to the first space 23.

This advantageous arrangement of the present disclosure makes it possible to ensure rigid and resistant retention of the first plate 2 relative to the second plate 3 around the axis of hinge Y1, and therefore of the first seat element D relative to the second seat element A, while ensuring precise adjustment of the position of these elements.

Alternatively, and without departing from the scope of the present disclosure, one or more of the sets 4 may comprise a different number of rolling elements 41, for example one or more than two, for example three or four.

According to one embodiment, the control cams 5 are provided to move in translation relative to the first hinge plate 2 substantially along a circle centered on the hinge axis Y1, in order to cause the transition of the rolling elements 41 from their unlocking position to their at least one locking position and vice versa.

Each control cam 5 is thus provided to move relative to the first hinge plate 2 substantially according to a rotational movement centered on the hinge axis Y1, in order to cause the rolling elements 41 to transition from their unlocking position to their at least one locking position and vice versa.

Advantageously, and as can be seen in FIGS. 5A and 5B, all the cams 5 may be provided to move in translation relative to the first hinge plate 2 substantially along a same circle centered on the hinge axis Y1, in order to cause the rolling elements 41 to transition from their unlocking position to their at least one locking position and vice versa.

According to one embodiment, and as can be seen more particularly in FIGS. 4A, 4B, and 5, the hinge 1 comprises at least four sets of rolling elements 4, preferably at least six.

This advantageous arrangement of the present disclosure also makes it possible to ensure rigid and resistant retention of the first plate 2 relative to the second plate 3 around the hinge axis Y1, and therefore of the first seat element D relative to the second seat element A, while ensuring precise adjustment of the position of these elements.

Advantageously, the different sets 4 may be spaced apart by a same angle between pairs, for example about 90° between two successive sets 4 if there are four sets 4 or about 60° between two successive sets 4 if there are six sets 4.

Advantageously, and as can be seen in FIGS. 4A to 6C, the hinge 1, and in particular the base toothed portion 21, the control cams 5, and the sets 4, may be configured so that not all the rolling elements 41 are simultaneously in the locking position. For example, it may be provided that only the rolling elements 41 of two sets 4, and in particular two sets 4 separated by an angle substantially equal to 180°, are in the locking position while the rolling elements 41 of the other sets 4 are in the unlocking position. This advantageously makes it possible to ensure rigid and resistant retention of the first plate 2 relative to the second plate 3 around the hinge axis Y1, and therefore of the first seat element D relative to the second seat element A, while ensuring a reduced adjustment increment between two immobile positions of the first plate 2 relative to the second 3, and advantageously smaller than the pitch of the base toothed portion 21 of the first plate 2.

According to one embodiment, the rolling elements 41 have a substantially circular cross-section.

Advantageously, as can be seen in FIGS. 5A and 5B, the spaces 23 between two successive teeth 22 of the base toothed portion 21 may also have a cross-section that is substantially a circle portion or substantially trapezoidal or substantially triangular, so as to maximize the contact surface between a rolling element 41 and the opposite faces of the teeth 22 surrounding the space 23.

This advantageous arrangement of the present disclosure also makes it possible to ensure rigid and resistant retention of the first plate 2 relative to the second plate 3 around the hinge axis Y1, and therefore of the first seat element D relative to the second seat element A, while ensuring easy manufacture and a reduced cost price of the rolling elements 41 as well as of the base toothed portion 21.

According to one embodiment, the rolling elements 41 are rollers 41 of substantially cylindrical shape, or balls.

Rollers 41 may be preferred in that they offer a larger contact surface with the faces of the teeth 22 of the base toothed portion 21, while balls have a reduced cost price.

Advantageously, the rolling elements 41 may be made of metal, and in particular of steel.

According to one embodiment, and as can be seen in FIGS. 4A, 4B, and 5B, the hinge 1 further comprises a guide piece 8, advantageously substantially annular, preferably centered on the hinge axis Y1, with a plurality of housings 81, each housing 81 at least partially receiving the rolling elements 41 of a set of rolling elements 4, and being configured to ensure: the retention in position of the rolling elements 41 of the set of rolling elements 4 in a direction substantially perpendicular to the radial direction of movement of the rolling elements 41 and to the axial direction Y of the hinge 1, and the guiding of the rolling elements 41 during their radial movement between their unlocking position and their at least one locking position and vice versa.

In particular, and as can be seen more particularly in FIG. 5B, at least one housing 81, preferably each housing 81, may be delimited, along the direction substantially perpendicular to the radial direction of movement of the rolling elements 41 and to the axial direction Y of the hinge 1, by two stop walls 82 positioned opposite one another, the rolling elements 41 of the at least one set of rolling elements 4 being interposed between the two stop walls 82 of the housing 81 so as to ensure: the retention in position of the rolling elements 41 in the direction substantially perpendicular to the radial direction of movement of the rolling elements 41 and to the axial direction Y of the hinge 1, and the guiding of the rolling elements 41 during their radial movement between their unlocking position and their at least one locking position and vice versa. Advantageously, the closest stop walls 82 of two adjacent housings 81 may be part of a spacer 83, interposed between two adjacent sets of rolling elements 4, and configured to ensure: the retention in position of the rolling elements 41 in the direction substantially perpendicular to the radial direction of movement of the rolling elements 41 and to the axial direction Y of the hinge 1, and the guiding of the rolling elements 41 during their radial movement between their unlocking position and their at least one unlocking position and vice versa.

The one or more spacers 83 may be formed and/or fixed on the guide piece 8.

The guide piece 8 may advantageously be rotationally integral with the second plate 3.

Advantageously, the housings 81 and/or the or each of the spacers 83 may have a substantially disk or cylinder shape.

According to one embodiment, at least one set of rolling elements 4 further comprises a force transmission element 42 interposed, along the radial direction of movement of the rolling elements 41, between the rolling elements 41 of the set of rolling elements and the control cam 5 with which they cooperate.

The force is thus not transmitted directly between the control cams 5 and the rolling elements 41 of the various sets 4, which advantageously allows the forces to be directed between the control cams 5 and the rolling elements 41 of the various sets 4 in a desired direction and simplifies the design of the control cams 5, in particular when one or more of the sets 4 comprises a plurality of rolling elements 41.

According to one embodiment, the force transmission element 42 is a roller 42 of substantially cylindrical shape, or a ball.

Rollers 42 may be preferred as they offer a larger contact surface with the rolling elements 41, and in particular when the rolling elements themselves are rollers 41 of substantially cylindrical shape, while balls have a reduced cost price.

Advantageously, the force transmission elements 42 may be made of metal, and in particular of steel.

Also, as can be seen more particularly in the embodiments of FIGS. 5A to 6C, the force transmission elements 42 may have a diameter greater than that of the rolling elements 41 of the set 4 with which it cooperates, and advantageously greater than 1.5 times the diameter of the rolling elements 41, and in particular when the set 4 comprises a plurality of rolling elements 41.

According to one embodiment, the force transmission element 42 bears against each of the rolling elements 41 of the set of rolling elements 4 and against the control cam 5 with which the rolling elements 41 cooperate.

In particular, as can be seen more particularly in FIGS. 5A to 6C, the rolling elements 41 and the force transmission element 42, at the at least one set 4, may be arranged so as to substantially form a triangle, in particular an isosceles triangle.

According to one embodiment, the force transmission element 42 is received in one of the housings 81 of the guide piece 8, the housing 81 also being configured to ensure: the retention in position of the force transmission element 42 in the direction substantially perpendicular to the radial direction of movement of the rolling elements 41 and to the axial direction Y of the hinge 1, and the guiding of the force transmission element 42 during its radial movement.

As can be seen in FIG. 5B, the housing 81 may also be delimited, in the direction substantially perpendicular to the radial direction of movement of the rolling elements 41 and to the axial direction Y of the hinge 1, by two additional stop walls 84 positioned opposite one another, the force transmission element 42 being interposed between the two stop walls 82 of the housing 81 so as to ensure: the retention in position of the force transmission element 42 in the direction substantially perpendicular to the radial direction of movement of the rolling elements 41 and to the axial direction Y of the hinge 1, and the guiding of the force transmission element 42 during its radial movement.

Advantageously, the additional stop walls 84 may each be positioned in the extension of a stop wall 82, as described above, and/or may each be formed as one piece with the stop wall 82.

Also, the closest additional stop walls 84 of two adjacent housings 81 may be part of a spacer 83, as described above.

According to one embodiment, the sets of rolling elements 4 are arranged in a same plane at the same axial position of the hinge 1, and so as to minimize the size of the hinge 1 in its axial direction Y and simplify its design.

As can be seen in FIG. 1, the present disclosure also relates to a vehicle seat S, and in particular a motor vehicle seat, comprising a seating portion A, a backrest D, and at least one hinge 1 according to one of the embodiments previously described between the seating portion A and the backrest D.

All of the provisions described above concerning a seat S equipped with a hinge 1 according to the present disclosure apply to the seat S according to the present disclosure.

A comparative vehicle seat hinge allows angular adjustment of a first element of the seat, for example the backrest of a motor vehicle seat, relative to a second element of the seat, for example the seating portion of the motor vehicle seat, around a main hinge axis.

Such a comparative hinge comprises a first and a second hinge plate intended to be integrally connected respectively to the backrest and to the seating portion of the seat, the first plate comprising a base toothed portion on a circular edge directed radially inwards, with N teeth regularly spaced apart by a base angular pitch of 360/N degrees. Furthermore, such a comparative hinge further comprises toothed locking bushes that can be moved and guided relative to the second plate in a radial displacement, between a locking position where the teeth of the bushes are engaged in the facing toothed portion of the first plate, and an unlocking position in which there is no mutual engagement of the teeth. A control cam associated with a control plate allows moving the locking bushes radially between these two positions.

Such a comparative hinge is satisfactory in terms of precision in adjusting the position of the first element of the seat relative to the second element of the seat, as it allows obtaining a locking increment (i.e. the increment between two successive locking positions) that is substantially reduced, or even zero, while providing a retention of the position of the first element of the seat relative to the second element of the seat with high mechanical resistance, particularly in the event of impact.

However, the complexity of such a comparative hinge increases its cost price in particular.

One object of the present disclosure is to provide an angular adjustment device for a vehicle seat, of simplified design and reduced cost price.

Another object of the present disclosure is to provide such an angular adjustment device which allows precise adjustment of the position of a first element of the seat relative to a second element of the seat.

Another object of the present disclosure is to provide such an angular adjustment device providing a retention of the position of the first element of the seat relative to the second element of the seat with high mechanical strength, particularly in the event of impact.

The present disclosure therefore relates to a hinge for angular adjustment of a first vehicle seat element relative to a second vehicle seat element around a hinge axis, the hinge comprising:
  a first and a second hinge plate intended to be integrally connected respectively to the first and to the second vehicle seat element, the first plate comprising a base toothed portion with N regularly spaced teeth,
  a plurality of sets of rolling elements, each comprising at least one rolling element, distributed around the hinge axis, each rolling element of each set being radially movable between at least one locking position, in which the rolling element is at least partially engaged in the space between two successive teeth, bearing against the opposite faces of the two successive teeth, and an unlocking position in which the rolling element is disengaged from the space between two successive teeth of the base toothed portion,
  a plurality of control cams, movable relative to the first hinge plate, and each cooperating with the rolling elements of a different set, such that the movement of each control cam relative to the first hinge plate causes the rolling elements to transition from their unlocking position to their at least one locking position and vice versa, each of the control cams being biased to return by a respective spring,
  a control hub able to move the control cams relative to the first hinge plate.

According to optional features of the present disclosure, taken alone or in combination:
  the base toothed portion extends substantially along a circle centered on the hinge axis, and the rolling elements of the sets of rolling elements are also distributed substantially along a circle centered on the hinge axis, at least in their unlocking position;
  the control cams are arranged to move in translation relative to the first hinge plate substantially along a circle centered on the hinge axis, in order to cause the rolling elements to transition from their unlocking position to their at least one locking position and vice versa;
  each set of rolling elements comprises two rolling elements arranged side by side, a first rolling element being provided to be received in a first space between two successive teeth of the base toothed portion in its at least one locking position, and a second rolling element being provided to be received in a second space between two successive teeth of the base toothed portion in its at least one locking position, the second space advantageously being adjacent to the first space;
  the hinge comprises at least four sets of rolling elements, preferably at least six;
  the rolling elements have a substantially circular cross-section;
  the rolling elements are rollers of substantially cylindrical shape, or balls;

the hinge further comprises a guide piece, advantageously substantially annular, with a plurality of housings, each housing at least partially receiving the rolling elements of a set of rolling elements, and being configured to ensure: the retention in position of the rolling elements of the set of rolling elements in a direction substantially perpendicular to the radial direction of movement of the rolling elements and to the axial direction of the hinge, and the guiding of the rolling elements during their radial movement between their unlocking position and their at least one unlocking position and vice versa;

at least one set of rolling elements further comprises a force transmission element interposed, in the radial direction of movement of the rolling elements, between the rolling elements of the set of rolling elements and the control cam with which they cooperate;

the force transmission element is a roller of substantially cylindrical shape, or a ball;

the force transmission element bears against each of the rolling elements of the set of rolling elements and against the control cam with which the rolling elements cooperate;

the force transmission element is received in one of the housings of the guide piece, the housing also being configured to ensure: the retention in position of the force transmission element in the direction substantially perpendicular to the radial direction of movement of the rolling elements and to the axial direction of the hinge, and the guiding of the force transmission element during its radial movement;

the sets of rolling elements are arranged in a same plane at the same axial position of the hinge.

The present disclosure also relates to a vehicle seat comprising a seating portion, a backrest, and at least one hinge according to any one of the embodiments of the present disclosure between the seating portion and the backrest.

The features set forth in the following paragraphs may optionally be implemented. They may be implemented independently of each other or in combination with each other.

A hinge (1) comprising:
a first and a second plate (2, 3) intended to be connected respectively to a first and to a second vehicle seat element (D, A), the first plate (2) comprising a base toothed portion (21) with N teeth (22),
a plurality of sets (4) of rolling elements (41), each radially movable between at least one locking position, in which the rolling element (41) is at least partially engaged in a space (23) between two teeth (22), and an unlocking position in which the rolling element (41) is disengaged from the space (23),
a plurality of movable cams (5), each cooperating with the rolling elements (41) of a different set (4), so as to cause the rolling elements (41) to transition from their unlocking position to a locking position, and vice versa,
a control hub (7), able to move the cams (5).

The invention claimed is:

1. A hinge for angular adjustment of a first vehicle seat element relative to a second vehicle seat element around a hinge axis, the hinge comprising:
a first and a second hinge plate integrally connected respectively to the first and to the second vehicle seat element, the first hinge plate comprising a base toothed portion with N regularly spaced teeth,
a plurality of sets of rolling elements, each comprising at least one rolling element, distributed around the hinge axis, each rolling element of each set being radially movable between at least one locking position, in which the rolling element is at least partially engaged in the space between two successive teeth, bearing against the opposite faces of the two successive teeth, and an unlocking position in which the rolling element is disengaged from the space between two successive teeth of the base toothed portion,
a plurality of control cams, movable relative to the first hinge plate, and each cooperating with the rolling elements of a different set, such that the movement of each control cam relative to the first hinge plate causes the rolling elements to transition from their unlocking position to their at least one locking position and vice versa, each of the control cams being biased to return by a respective spring,
and a control hub able to move the control cams relative to the first hinge plate.

2. The hinge of claim 1, wherein the base toothed portion extends substantially along a circle centered on the hinge axis, and wherein the rolling elements of the sets of rolling elements are also distributed substantially along a circle centered on the hinge axis, at least in their unlocking position.

3. The hinge of claim 1, wherein the control cams are arranged to move in translation relative to the first hinge plate substantially along a circle centered on the hinge axis, in order to cause the rolling elements to transition from their unlocking position to their at least one locking position and vice versa.

4. The hinge of claim 1, wherein each set of rolling elements comprises two rolling elements arranged side by side, a first rolling element being provided to be received in a first space between two successive teeth of the base toothed portion in its at least one locking position, and a second rolling element being provided to be received in a second space between two successive teeth of the base toothed portion in its at least one locking position, the second space advantageously being adjacent to the first space.

5. The hinge of claim 1, comprising at least four sets of rolling elements, preferably at least six.

6. The hinge of claim 1, wherein the rolling elements have a substantially circular cross-section.

7. The hinge of claim 6, wherein the rolling elements are rollers of substantially cylindrical shape, or balls.

8. The hinge of claim 1, further comprising a guide piece, advantageously substantially annular, with a plurality of housings, each housing at least partially receiving the rolling elements of a set of rolling elements, and being configured to ensure: the retention in position of the rolling elements of the set of rolling elements in a direction substantially perpendicular to the radial direction of movement of the rolling elements and to an axial direction of the hinge, and the guiding of the rolling elements during their radial movement between their unlocking position and their at least one unlocking position and vice versa.

9. The hinge of claim 1, wherein at least one set of rolling elements further comprises a force transmission element interposed, in the radial direction of movement of the rolling elements, between the rolling elements of the set of rolling elements and the control cam with which they cooperate.

10. The hinge of claim 9, wherein the force transmission element is a roller of substantially cylindrical shape, or a ball.

* * * * *